Feb. 27, 1968

C. Q. GREGORY 3,371,171

IGNITION CUT-OFF DEVICE

Filed March 2, 1967

INVENTOR
CHARLES Q. GREGORY
BY
James J. Mullen
ATTORNEY

Feb. 27, 1968    C. Q. GREGORY    3,371,171
IGNITION CUT-OFF DEVICE

Filed March 2, 1967    4 Sheets-Sheet 2

INVENTOR
CHARLES Q. GREGORY
BY
James J. Mullen
ATTORNEY

Feb. 27, 1968   C. Q. GREGORY   3,371,171
IGNITION CUT-OFF DEVICE

Filed March 2, 1967   4 Sheets-Sheet 3

INVENTOR
CHARLES Q. GREGORY
BY James J. Mullen
ATTORNEY

INVENTOR
CHARLES Q. GREGORY
BY
*James J. Mullen*
ATTORNEY

United States Patent Office 3,371,171
Patented Feb. 27, 1968

3,371,171
IGNITION CUT-OFF DEVICE
Charles Q. Gregory, 10428 Driver, Overland, Mo. 63114
Filed Mar. 2, 1967, Ser. No. 620,157
17 Claims. (Cl. 200—61.45)

ABSTRACT OF THE DISCLOSURE

The present invention covers, in part, a tilt responsive switch for sensing orientation of an element such as a tractor and terminates a continuous signal when the orientation has exceeded a predetermined limit so that such signal termination causes the ignition of said tractor to be cut off. This switch comprises a housing adapted for rigid mounting on said element and being movable therewith. Such housing has a first and second chamber, a fluid duct connecting said chambers, a pair of electric terminals extending into said housing and an electrically conductive fluid such as mercury in said housing and being freely movable between said chambers. The electric terminals are located in said housing so that both of said terminals contact said fluid when said housing is orientated in a first position, thus providing a continuous signal caused by the electrical connection between said terminals (the opposite ends of which are connected to an outside power source), and at least one of said terminals remains out of contact with said fluid when said housing is orientated to a second position so that said signal terminates when said terminals are electrically disconnected from each other by the removal of said fluid from contact with both of said terminals when said element is orientated to a position which exceeds said predetermined limit. In other parts of the present invention, said housing includes either four or six chambers, some of which have a plurality of fluid ducts and a plurality of gas ducts therebetween. In the four chamber-containing housing, there is only one pair of electric terminals, whereas in the six chamber-containing housing there are three pairs of electric terminals so that upon various orientations of either of said housings the movement of said element beyond a predetermined limit results in only one of said terminals (i.e., of a pair of terminals) being in contact with mercury and thus cuts off the ignition system of an element such as a tractor. Another part of the present invention covers a U shaped member having affixed thereto three separate tilt responsive switches which provide ignition cutoff when a vehicle orientates beyond a predetermined limit, for example, moves in an upward arcuate manner either from the front to the rear or from one side to the other side.

---

The present invention generally relates to a tilt responsive or gravity actuated safety switch for engines of mobile vehicles and airplanes, the engines of which employ electrical current from a battery or magneto to sparkplugs for igniting the gas vapors within the cylinders of said engines. The present invention more particularly covers a novel type of mercury switch containing no moving parts whatsoever but being of such configuration and design whereby an ignition system may be cut off under certain undesirable conditions, i.e., orientates beyond a predetermined limit, but said engine being operable, by the same token, when subjected to minor shocks, vibrations, and certain minor elevations.

In the past, hundreds of people have been burned to death while riding in a vehicle or aeroplane which accidentally turned over or crashed. In such instances, the driver or pilot was temporarily unconscious because of shock or injury so that he was unable to turn off the ignition switch. Consequently, gasoline or other combustible motor fuel leaked from the carburetor, broken fuel lines, or gas tank onto the distributor, generator or shattered wires and caused instantaneous fire. An engine fuel fire spreads rapidly and engulfs the passengers quickly before they can regain consciousness. By the same token, the injury resulting from a partial turnover of, for example, a tractor, whereby the operator is thrown to the ground and the tractor continues to operate and thus crashes and/or runs over the operator, is likewise severe. It is quite apparent, then, that there has existed in the art a need for an ignition cut-off device to eliminate the aforementioned serious problems.

Prior to the present invention, one safety device for allegedly eliminating the aforementioned problems was what is commonly known in the art as a mercury switch. Such a switch generally comprises a chamber partially filled with mercury and containing a pair of electrodes. When the mercury comes in contact with said electrodes, an electrical circuit is completed and the ignition system is operational. When the mercury switch is tilted or turned over and the mercury is not in simultaneous contact with both electrodes, the circuit is broken and, thus, the engine is cut off. One of the major problems and disadvantages of these prior art mercury switches is their inability to maintain a continuous electrical circuit (1) when such switch is subjected to minor shocks and/or vibrations, and (2) when such a switch is physically incorporated into, for example, an electrical ignition system of a movable vehicle such as a tractor, which subsequently is subjected to various orientations, i.e., beyond certain predetermined elevations with respect to the horizon. Consequently, a vehicle, such as a tractor, has its engine frequently cut off due to such shocks and vibrations and, thus, numerous reignitions must be undertaken.

In the past, then, the prior art has generally recognized the effectiveness of a mercury switch as illustrated by some of the following publications. (While the following publications and the present specification are generally directed to the utilization of a mercury switch on a vehicle such as a tractor, this type vehicle is for exemplary purposes only and is not to be considered as a critical limitation to the present invention. As previously mentioned, a mercury switch may be employed with any type of mobile vehicle, for example, cars, lawnmowers and the like, and, in certain cases and conditions, with airplanes.)

Referring now more specifically to the prior art, U.S. Patent No. 1,519,079, issued on Dec. 9, 1924, to E. H. Whiting, discloses an automatic safety tractor device generally comprising a "mercury box" mounted on the side of a tractor engine. This mercury box is more specifically shown in FIGURES 3 and 4 of the aforementioned patent and comprises a box of a "bowtie-shaped" configuration held in position by a pair of spaced trunnions in the middle thereof which permit the mercury box to freely rotate about an axis provided by said trunnions when the tractor is moving. Consequently, when the tractor is in an undesirable elevational position, the mercury box rotates to provide a break in the electrical circuit and thus stops the tractor engine.

In U.S. Patent No. 1,611,772, issued on Dec. 21, 1926, to W. H. O'Dell, there is disclosed a circuit breaker which comprises a single chamber containing a volume of mercury. This mercury gravitates towards the opposite end of the cylinder, than that end containing the contact points for the circuit, when the tractor is in a tilted or undesirable position and, consequently, there is a break in the circuit.

In U.S. Patent No. 2,130,500, issued on Sept. 20, 1938, to E. D. Lawson, the patentee describes an automatic safety switch for vehicles which comprises, in part, a single chamber containing a spaced pair of electrodes. This chamber is provided with a baffle adjacent to the electrodes, which baffle allegedly prevents the mercury from moving away from said electrodes during certain surgings thereof caused by any small vibrations to the chamber which is incorporated into an electrical system of a vehicle engine. The overall automatic safety switch for his vehicle usually encompasses two of such chambers, each acting independently of the other, in an X type formation, both of which are held in such position by means of a block of resilient material such as rubber.

A further version of a mercury safety switch is disclosed in U.S. Patent 2,541,571, issued on Feb. 13, 1951, to K. S. Clapp. In this patent, there is disclosed a single chamber containing a volume of mercury therein and which also contains two spaced contact points surrounded by two baffles which allegedly control the movement of the mercury and, thus, overcome any sudden shocks or surgings of the mercury.

A still further version of a tractor safety switch of the mercury type is disclosed in U.S. Patent No. 2,721,912, issued on Oct. 25, 1955, to J. L. Rutledge. This type of mercury switch described in said patent comprises a housing containing two chambers, one of which is constructed of glass and the other of which is constructed of metal, said chambers being interconnected by a transfer tube and an air vent tube. This pair of chambers, positioned by a third member, rotates about an axis of such member. Attached to the end of the conductive metal mercury tube is a contactor which, when the mercury flows into said conductive metal tube causes said contactor to engage a contact plate and thereby short out the ignition system of the engine of said tractor. The disadvantages associated with this type of switch are numerous. Specifically, it will be noted that the switch provides no effective means to compensate for the surgings of the mercury in said chambers, or for severe vibrations, or the stopping and starting of said tractor. Consequently, in such cases, the mercury will flow from the glass chamber to the conductive metal mercury chamber and immediately cause the ignition system of said tractor to be cut off. Secondly, another major disadvantage is that said switch will not cut off the ignition of a tractor which exceeds a certain predetermined level of, for example, either of the side wheels which would thus cause said tractor to turn over on either its left side or right side with the engine still operating. In this latter case, if the operator is thrown to the ground due to such orientation, he could be severely injured by the tractor running over him. Another major disadvantage with Rutledge's switch is that the contactor would have to be frequently replaced since it would frequently engage with the contact plate and thus be bent out of shape, worn, and subjected to other abrasive actions. A still further major disadvantage with Rutledge's switch is that, with the pivotal motion of said chambers, the glass mercury tube would be frequently subjected to being broken when coming in contact with the rest plate when the tractor is subjected to the aforementioned vibrations, shocks, startings, and stoppings.

In U.S. Patent No. 2,759,056, issued on Aug. 14, 1956, to W. B. Challman, there is described an electrically operated tractor-anti-tilting device which is of the non-mercury type. More specifically, the patentee has for coaction, with an operation of a circuit breaker, a pendulum-device located within a housing and suspended in a variable or changeable bath of oil or other suitable liquid and wherein the pendulum-device is controlled by the force of gravity with a tendency to constantly assume a perpendicular or vertical position within the housing. It is further pointed out that under the normal movements of a tractor, with the safety switch closed and the activator of the switch in inoperative position, the weight of the pendulum swings in a deep and dense bath of oil. The activating device is thereby stabilized and its movement is retarded or dampened during normal vibrations due to ordinary starting, acceleration, and stopping of the tractor. However, when the tractor starts up an incline, the upward movement thereof results in a reduction in the quantity and density of the effective oil bath that surrounds the weight of the pendulum. Due to force of the gravity, the weighted pendulum remains in a vertical position while the relatively movable housing swings freely about the encircled activator, and as the tractor reaches a hazardous inclination, the further movement of the tractor-housing, in combination with the stationary activator, pushes open the safety switch and breaks the ignition circuit.

Another type of mercury safety switch for ignition cut off is described in U.S. Patent No. 2,782,276, issued on Feb. 19, 1957, to G. J. Woods In this patent, there is described the utilization of three chambers, each of which contains mercury, is disposed about the perimeter of a rectangular shaped box, and is in an inclined position thereon These switches are in series whereby it is alleged that tilting of the tractor from either the left side, the right side or in an upward and backward motion will gravity actuate said mercury containing chambers and thus cause a break in the ignition circuit. The individual mercury switch in this patent is simply a single chamber containing a single electrode and a volume of mercury. This chamber is, in turn, contained within a concentric housing which acts as a second electrode. Consequently, when the mercury moves from the end containing the single electrode, there is thus caused a break in the electrical circuit.

In conjunction with the foregoing patents regarding the mercury type ignition cut-off devices and also the non-mercury type ignition cut-off device as described in U.S. 2,759,056, the disadvantages of these devices are readily apparent. More specifically and first, it will be noted that each device is quite complex and involves numerous moving parts and/or stationary parts which continuously require cleaning, replacement and overall maintenance due to the coditions under which they are operated. In addition to the above disadvantage and as a second major disadvantage, it will be noted that each of said alleged safety devices would be quite expensive in construction cost and installation on a tractor, and consequently would be economically prohibitive to the average tractor owner. Another major disadvantage with the above-described ignition cut-off device is the inability of such devices to continuously be subjected to and undergo minor vibrations, shocks and mercury surgings without cutting off the ignition of a vehicle. Furthermore, none of the devices heretofore shown in these prior art publications provide for ignition cut-off when a tractor undergoes various orientations either from the left or right sides or from those created when the tractor's front end lifts off the ground towards the back end.

In view of the aforementioned prior art publications and their inherent disadvantages, it can readily be seen, then, that there is still a need for the provision of (1) an electrical ignition cut-off switch utilizing a fluid which, under normal tractor movements, does not cut off the ignition, and (2) a simple switch without introducing features of construction thereto which complicate such switch and increase its cost. By the same token, safety demands the provision of a switch which, when there is an undesired movement or tilting of the vehicle having such a switch, results in the quickest and most effective removal of a maximum amount of fluid from the electrode-containing chamber the instant that the vehicle is tilted to an undesirable or hazardous position so that the switch may act immediately to cut off the ignition. The present invention so provides for such a switch for ignition cut-off and eliminates all of the aforementioned disadvantages associated with the prior art as exemplified by the aforementioned patents, which are all hereby incorporated herein by reference.

Accordingly, it is one object of the present invention to provide a mercury fluid type safety switch which is simple and inexpensive in construction and in which means is provided to prevent undesired surging of the mercury fluid during normal operation of the motor vehicle even though it may be operating over extremely rough roads or other uneven ground.

It is another object of this invention to provide a novel mercury switch for ignition cut-off which maintains the body of the fluid in a certain predetermined position and shape until the abnormal forces developed by the vehicle turning over or tilting beyond a predetermined angle shall be sufficient to break down or alter this status.

It is a more salient object of this invention to provide a mercury-type ignition cut-off switch which prevents the washing of the current conducting fluid away from the electrical contacts under severe vibrations, jolting or sudden turns and stops of the vehicle and yet provides a maximum free-flow of current conducting fluid the instant the vehicle is tilted beyond a predetermined limit so that the switch may act immediately to cut off the ignition.

Another object of the present invention is the provision of a mercury type ignition cut-off switch which incorporates a series of individual tilt responsive switches which are effective, when the tilting of each side of the tractor and also the upward and backward arcuate motion of the tractor occurs, to instantaneously cut off an engine.

A further object of the present invention is the provision of a plurality of mercury type ignition cut-off switches contained in one unit and which unit "senses" abnormal orientations of a vehicle on both sides thereof and in the front thereof.

An additional object of the present invention is to automatically and instantaneously shut off the flow of electrical current in the ignition system of an engine when a vehicle or (taxiing or landing) airplane turns on its side or upside down or in another predetermined position so that there will be no danger of fire from electrical sparks, which frequently causes loss of life and damage to property, by igniting the gas vapors when the carburetor is in an inverted or semi-inverted position.

Other objects and a more clear understanding of the present invention will become apparent by referring to the following description and claims, taken in conjunction with the accompanying drawings, in which:

Figure 1:
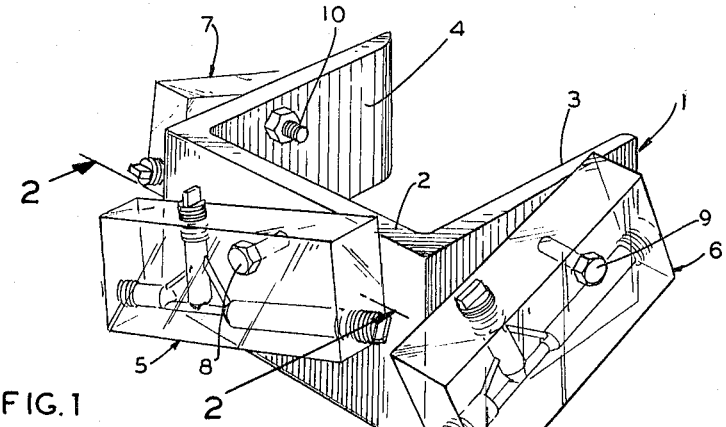
FIGURE 1 is a perspective view of an ignition system cut-off device for a vehicle or airplane and showing three tilt responsive switches detachably mounted to a U-shaped member.

Referring now more specifically to the individual drawings, FIGURE 1 is a perspective view of one type of ignition cut-off assembly device of the present invention and comprises an ignition cut-off assembly 1 which is generally in the configuration of a U-shaped member having a front wall or plate 2 and side walls 3 and 4, which make up the "legs" of the overall assembly 1. Detachably mounted to plates 2, 3 and 4 respectively are the individual tilt responsive switches 5, 6 and 7, held to said plates by means of detachable fasteners 8, 9 and 10 such as nuts and bolts and the like. Such detachable fasteners actually extend through, for example, holes 5a, shown in tilt responsive switch 5, in order to be bolted on the inner side of plate 2.

Tilt responsive switches 5, 6 and 7 are mounted on plates 2, 3 and 4 and so positioned thereon at an angle of from about 5° to about 60°, preferably from about 20° to about 40°, with respect to a horizontal plane. The inclination of said switches (when the assembly is mounted on an element) is predicated upon the terrain the element, such as a tractor, will travel upon and the selection of a predetermined limit, i.e., angle or inclination which the tractor can be elevated, which one desires to choose as safe, whereby beyond said limit any of the tilt responsive switches operates to cut off the ignition of said tractor.

Figure 2:
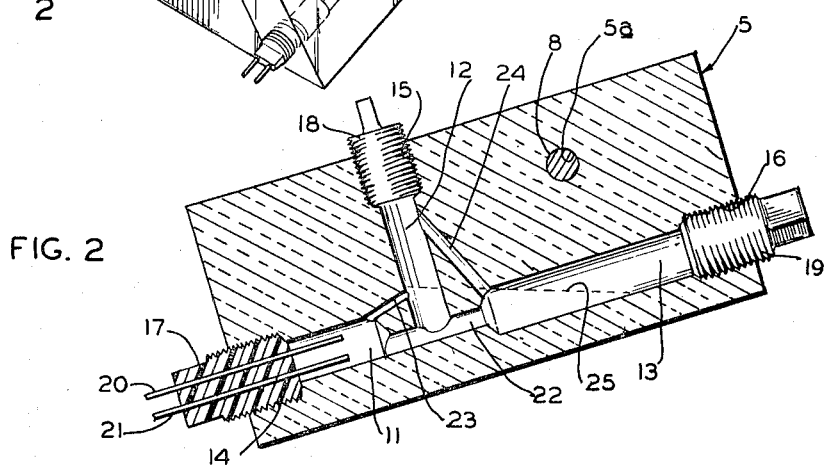
FIGURE 2 is a cross-sectional view of a tilt responsive switch taken along line 2—2 of FIGURE 1.

FIGURE 2 is a cross-sectional view taken along line 2—2 of FIGURE 1 and more particularly of tilt responsive switch 5 and shows a more clear view of the individual parts of said switch 5. More specifically, said switch 5, which, in essence, is a housing of unitary type, contains three chambers 11, 12 and 13, each of which are cylindrical, preferably right circular cylinders, in shape and longitudinally extending as shown in FIGURE 2. At the outer ends of chambers 12, 13 and 14, respectively, are counterbores 14, 15, and 16 which provide access means from outside said housing to the interior of said chambers and which, in turn, are threaded and enclosed by means of closures 17, 18 and 19 which, for example, can be threaded, solid cylindrical members. It will be noted that closure 17 contains electrodes 20 and 21 which completely extend the full longitudinal length thereof and protrude, when closure 17 is positioned in counterbore 14, into chamber 11 to provide a pair of spaced electrical terminals therein. Referring again to chambers 11, 12 and 13, said chambers have substantially the same internal diameter, for example, from about 1/16 inch to about one inch, preferably from about 1/8 inch to about 1/2 inch. Chambers 11 and 13 have separate axes which are substantially parallel to each other, the axis of chamber 13, however, is beneath the axis of chamber 11. The axis of chamber 12 is substantially perpendicular to the axes of chambers 11 and 13 if said axes were extended towards each other.

Chambers 11, 12 and 13 constitute a confined space whereby a fluid can freely move between each chamber in response to the reorientation of said switch when mounted on said element.

Chambers 11 and 13 are interconnected to each other by means of passageway or fluid duct 22 which has a smaller internal diameter than the internal diameter of either of said chambers; for example, if chamber 11 is ¼ inch in diameter, fluid duct 22 may be ⅛ inch in diameter. It will be noted that chamber 12 also communicates with fluid duct 22. Chambers 11 and 12 are further interconnected, as shown in FIGURE 2, by passageway or gas duct 23 which has a smaller internal diameter than the internal diameter of either fluid duct 22 or of said chambers 11 or 12 or 13. By the same token, chambers 12 and 13 are also further interconnected by means of passageway or gas duct 24 which has a smaller internal diameter, for example ¹⁄₁₆ inch, than the internal diameters of either fluid duct 22, for example ⅛ inch, or chambers 12 or 13, for example ¼ inch.

Fluid duct 22 and gas ducts 23 and 24 are each substantially in the form of a longitudinally extending cylinder. The axis of gas duct 23 is generally non-parallel to the axis of either fluid duct 22 or chamber 11. Furthermore, the axis of gas duct 24 is generally non-parallel to the axis of fluid duct 22 or chamber 13.

As previously mentioned, chambers 11, 12 and 13 usually constitute a confined space for a volume of free-moving, liquid, electrical conducting fluid such as mercury which, when switch 5 is inclined, has a level as indicated along dotted line 25 of FIGURE 2. In FIGURE 2, the electrical conducting fluid, such as mercury, completely encompasses electrodes 20 and 21. Thus, when the outer ends of said electrodes are connected to an ignition system, such as that depicted in FIGURE 15, the system makes a complete electrical circuit via or through electrodes 20 and 21 and renders the overall system operable. By the same token, when a vehicle incorporating such a tilt responsive switch is orientated beyond a predetermined limit, i.e., tilted to an undesirable position with respect to the horizon, the electrical circuit is broken due to the electrical conducting fluid such as mercury contacting only one electrode 21, for example, being at a level as indicated at dotted line 26 in FIGURE 3. In the actual transition or reorientation of tilt responsive switch 5 from FIGURE 2 to FIGURE 3, the mercury level in chamber 12 substantially lowers and thus permits air to enter from chamber 13 via gas duct 24. Furthermore, there is a fast exit of mercury from chamber 11 to chamber 13 via passageway or fluid duct 22. Gas ducts 23 and 24 generally function, it is believed, as air vents to equalize the pressure in the three interconnecting chambers. Gas duct 23 extends from the right-hand or end portion of chamber 11 and at the very top-most portion thereof to a point and opening into the lower portion of chamber 12. Likewise, passageway or gas duct 24 communicates with chamber 13 at the left-most or end portion thereof, opening into the top-most portion thereof, and also communicates with chamber 12 at the upper portion thereof just beneath counterbore 15.

Figure 3:
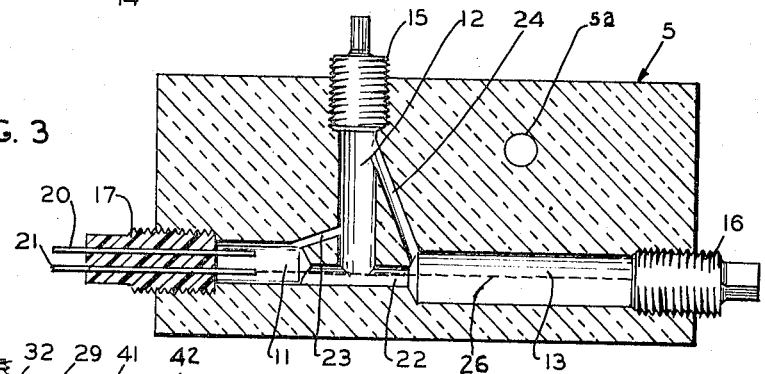
FIGURE 3 is the same cross-sectional view as set forth in FIGURE 2 except that the tilt responsive switch has been removed from the U-shaped member shown in FIGURE 1 and is positioned in a horizontal plane to depict the mercury level thereof as contrasted to the mercury level set forth in FIGURE 2.
Figure 4:
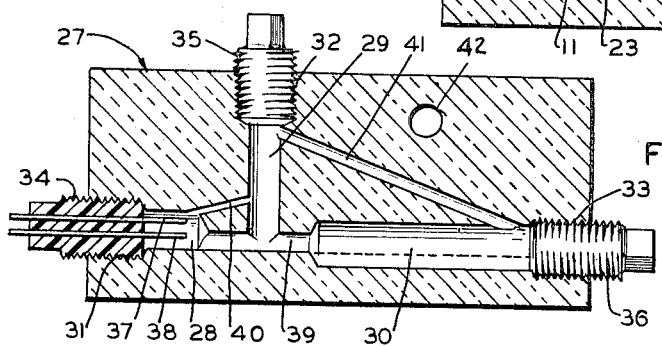
FIGURE 4 is a modification of the tilt responsive switches shown in FIGURES 1, 2 and 3.

FIGURE 4 shows a modification of FIGURE 3 and, more specifically, the different positions of entry by a gas duct into one of the chambers. Specifically in FIGURE 4, tilt responsive switch 27 contains chambers 28, 29 and 30, which are generally less than 6 inches in length, having threaded counterbores 31, 32 and 33 which, in turn, are closed or sealed by removable closures 34, 35 and 36. FIGURE 4 is similar to FIGURES 2 and 3 in that the left-hand chamber 28 contains a pair of spaced electrical terminals 37 and 38 which actually extend longitudinally the length of closure 34 and protrude, for example, from about ¹⁄₁₆ inch to about 1 inch in length, into chamber 28. Chambers 28 and 30 are interconnected by means of passageway or fluid duct 39 which is also connected to chamber 29. Likewise, passageway or gas duct 40 interconnects chamber 28 with chamber 29. Now referring more specifically to passageway or gas duct 41 which interconnects chambers 29 and 30, the lower right-hand portion of passageway 41 communicates with chamber 30 at the right-hand portion thereof immediately adjacent to counter-bore 33. Thus, it can be seen by the relative positions of passageway 24, FIGURE 3, and passageway 41, FIGURE 4, that the exact location of the passageway interconnecting the vertically extending chamber, i.e., chambers 12 or 39, with the right-hand chamber, i.e., chambers 13 or 30, is not critical but said passageway may interconnect the righthand horizontally extending chamber, such as chambers 13 or 30, anywhere along the outer, longitudinally extending (generally) top peripheral surface in order to provide a means of transfer of air between chambers 29 and 30 in order to equalize the pressure therebetween during the orientation of switch 27.

While gas duct 40, FIGURE 4, is positioned in a similar fashion as gas duct 23, FIGURES 2 and 3, duct 40 may also communicate with chamber 28 anywhere along the outer, longitudinally extending (generally) top peripheral surface thereof. However, it is desirable that duct 40 be positioned in the manner as shown in FIGURES 2 through 4.

In conjunction with the tilt responsive switches shown in FIGURES 1 through 4, it is preferred that the materials of construction have a high dielectric value. High dielectric materials may include, for example, material constructed from organic resinous plastic such as (a) methylmethacrylate type resins such as those materials usually sold under the trademarks Plexiglas or Lucite and (b) phenol formaldehyde, urea formaldehyde and styrene. It is generally preferred to have the tilt responsive switches constructed of molded polystyrene which is transparent so that one may observe the mercury within the chambers. The molded polystyrene is generally preferred for one reason since it has substantially a zero porosity and thus prevents any moisture from passing into the various chambers or passageways. Furthermore, the closures set forth in FIGURES 1 through 4 may also be of molded polystyrene or even of a material such as that commercially sold under the trademark Teflon. It is to be understood, however, that this molded polystyrene is not critical and that other organic resinous plastic materials, in addition to materials such as glass, ceramics and the like, may be utilized.

Figure 5:
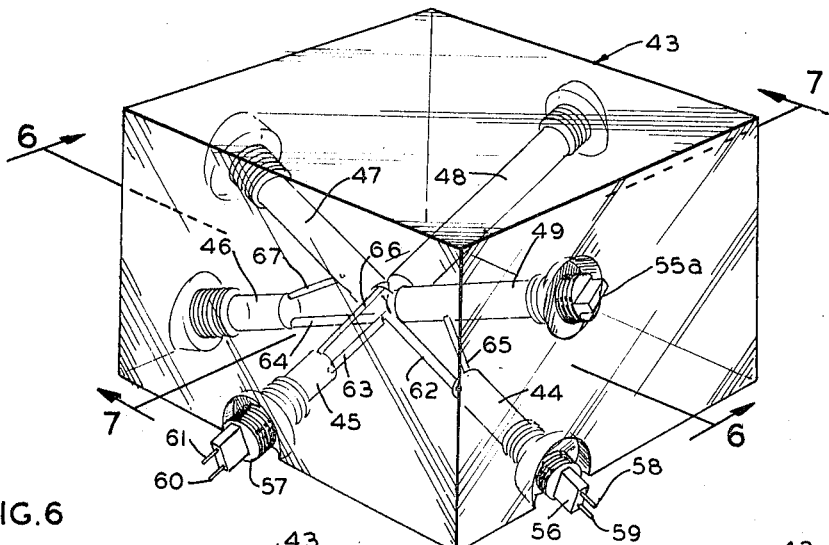
FIGURE 5 is a perspective view of a modification of FIGURE 1 and depicts an ignition cut-off assembly device wherein the three tilt responsive switches are incorporated in one unitary unit.

FIGURE 5 depicts a modification of the ignition cut-off device 43, which, in essence, is a tilt responsive switch sensitive to the orientations of said element in three directions. This switch 43 is a unitary block of high dielectric material such as molded polystyrene and contains chambers 44, 45 and 46 and reservoir chambers 47, 48 and 49. It is to be noted that in this switch or ignition cut-off assembly device, there is no vertically extending reservoir chamber as that depicted in FIGURES 1 through 4, for example, chambers 12 or 29 respectively shown in FIGURES 3 and 4. This novel ignition cut-off device 43 is of such a configuration and design that the other chambers, that is chambers 47 through 49, collectively provide sufficient amount of reservoir area within which to adequately receive the mercury from either of chambers 44, 45 or 46 when switch 43 is subjected to various orientations. Furthermore, it will be noted that, in essence, assembly device 43 has three tilt responsive switches and each one is so positioned as to register the orientation of either the left side, the right side or the front of an element or a vehicle. Thus, when such vehicle is tilted beyond a predetermined limit or position, any one of the switches will immediately and instantaneously cause a break in the overall electrical circuit and, consequently, stop the engine.

Referring again to FIGURE 5, threaded counterbores 50 through 55, i.e., 50, 51, 52, 53, 54, and 55, are the respective counterbores for chambers 44 through 49. Detachable closures 56 and 57, respectively, are provided for and shown sealing counterbores 50 and 51. By the same token, detachable closure 68 is shown sealing counterbore 52 in FIGURE 6 and detachable closure 71 is shown sealing counterbore 54 in FIGURE 7. Likewise, closures 53a and 55a are shown sealing counterbores 53 and 55 in FIGURE 6.

In FIGURE 5, a pair of spaced electrical terminals 58 and 59 and another pair 60 and 61 are shown longitudinally extending, respectively, through closures 56 and 57 and protrude into and terminate in, respectively, chambers 44 and 45. A series of passageways 62 through 67 provide means for communication or interconnection between chambers 44 through 49. For example, fluid ducts or passageways 62, 63 and 64 interconnect, respectively, chambers 44 and 47, 45 and 48, and 46 and 49. Likewise, gas ducts or passageways 65, 66 and 67 interconnect, respectively, chambers 44 and 49, chambers 46 and 47, and chambers 45 and 47. As previously mentioned, due to the novel and unique configuration of the separate tilt responsive switches shown in FIGURE 5, there is no need for a third or further reservoir chamber per pair of chambers, for example, chambers 45 and 48.

Figures 6, 7:
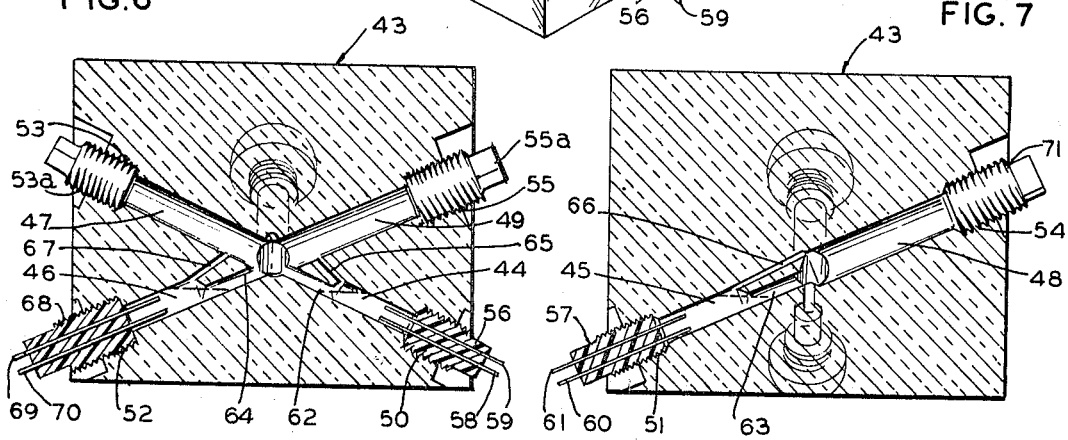
FIGURE 6 is a cross-sectional view of the ignition cut-off assembly device taken along line 6—6 of FIGURE 5.
FIGURE 7 is a cross-sectional view of the ignition cut-off assembly device taken along line 7—7 of FIGURE 5.

Now referring to FIGURE 6, which is a cross-section of FIGURE 5 taken along line 6—6, closure 68 contains electrodes 69 and 70 which extend longitudinally therethrough and terminate in the interior area of chamber 46. Likewise, FIGURE 7, which is a cross-sectional view of FIGURE 5 taken along line 7—7, discloses closure 71 positioned in counterbore 54. FIGURES 6 and 7 are presented to more clearly point out the individual tilt responsive switches and thus render a vivid comparison between the ignition cut-off assembly device disclosed in FIGURE 1 and, specifically, the individual tilt responsive switches 4, 5 and 6.

Figure 15:
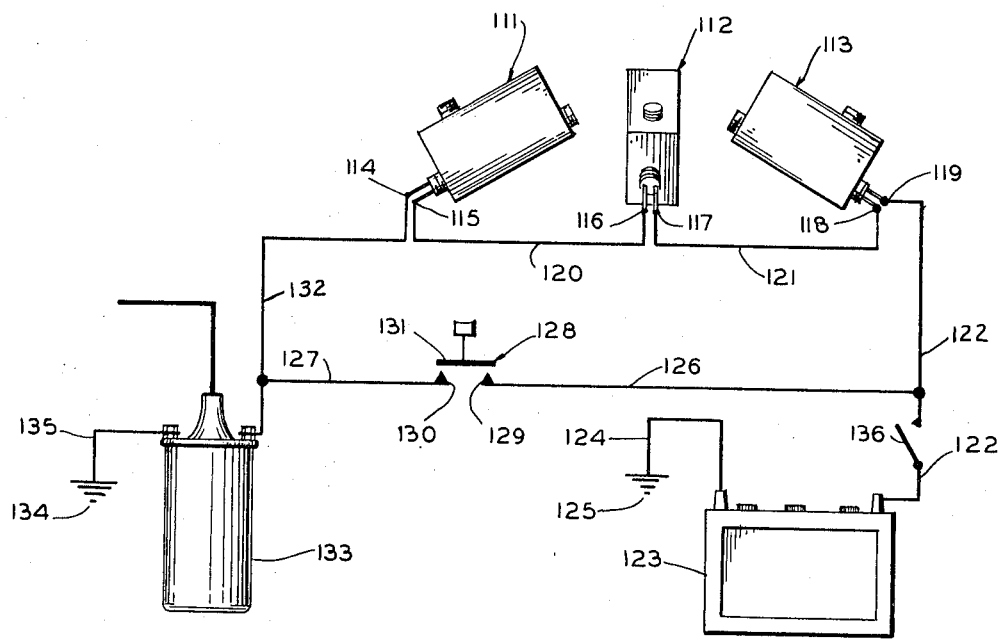
FIGURE 15 is a diagrammatic view of an ignition system of an engine for a vehicle or airplane, and showing the ignition cut-off assembly device of FIGURE 1 containing the three tilt responsive switches electrically connected in the overall system.

Referring collectively to FIGURES 5, 6, and 7, it is again pointed out that this device 43 is, in essence, a tilt responsive switch which actually contains three similar type switches as shown in FIGURES 2 through 4. However, switch 43 is more versatile in that the orientations of an element, such as a tractor, are sensed in three different directions whereas switch 5 only permits a single directional orientation to be sensed. For example, if switch 43 were mounted on a tractor and electrically incorporated into its ignition system (as shown in FIGURE 15), chambers 45 and 48 would function as one directional sensor. Stated differently, if 43 were mounted on said tractor with chamber 45 being closest to the front end of said tractor, the elevation of the front end of the tractor in an upward arcuate manner towards the rear end would cause said switch, i.e., chambers 45 and 48, to cut off the ignition thereof when a predetermined limit or angle of inclination was exceeded. More specifically, the mercury in chamber 45 contacting electrodes 60 and 61 would exit therefrom to chamber 48; some mercury would probably also exit to the other chambers and/or passageways. Likewise, chambers 46 and 49, comprising a second directional sensor, would cause the ignition system of the tractor to be cut off when the right wheel or side of said tractor were elevated beyond a predetermined limit or angle. By the same token, chambers 44 and 47, comprising a third directional sensor, would cause such ignition cut-off when the left wheel or side of the tractor were elevated beyond a predetermined limit or angle.

Chambers 44 through 49, FIGURES 5–7, are each substantially in the form of a longitudinally extending cylinder, preferably a right circular cylinder, and have substantially the same internal diameters. Chambers 47, 48 and 49 have their respective axes beneath the respective axes of chambers 44, 45 and 46. The axes of chambers 47, 48, and 49 are substantially parallel to the respective axes of chambers 44, 45 and 46; i.e., the axis of chamber 44 is substantially parallel to the axis of chamber 47. The chambers and fluid ducts are inclined with respect to a horizontal plane and form an angle therewith of from about 5° to about 60°, preferably from about 20° to about 40°. However, each chamber and duct should have substantially the same angle of inclination in order to provide a common space whereby the ends of three chambers and the three fluid ducts meet and communicate with each other.

Fluid ducts 62, 63 and 64, FIGURES 5–7, are each substantially in the form of a longitudinally extending cylinder, preferably a right circular cylinder, and have substantially the same internal diameters, but less than the internal diameter of any one of chambers 44 through 49. It is preferred that fluid ducts 62, 63, and 64 (and also fluid duct 22 of FIGURES 2–4) communicate with the lower most portion of the respective ends of the electrode or electric terminal-containing chambers, i.e., chambers 44, 45 and 46. Furthermore, it is preferred that the lowermost, longitudinally extending, peripheral wall of a fluid duct (if extended) be tangential to the lower most, peripheral wall of an electrode-containing chamber.

Gas ducts 65, 66, and 67, FIGURES 5–7, are each substantially in the form of a longitudinally extending cylinder, preferably a right circular cylinder and preferably have substantially the same internal diameter but less than the internal diameter of any one of the fluid ducts 62–64 or chambers 44–49. It is preferred that the gas ducts 65, 66 and 67 communicate, respectively, with the lower portions of chambers 49, 48 and 47. Furthermore, it is preferred that the respective axes of gas ducts 65, 66, and 67 be non-parallel with the respective axes of chambers 44, 45, and 46.

Figure 8:
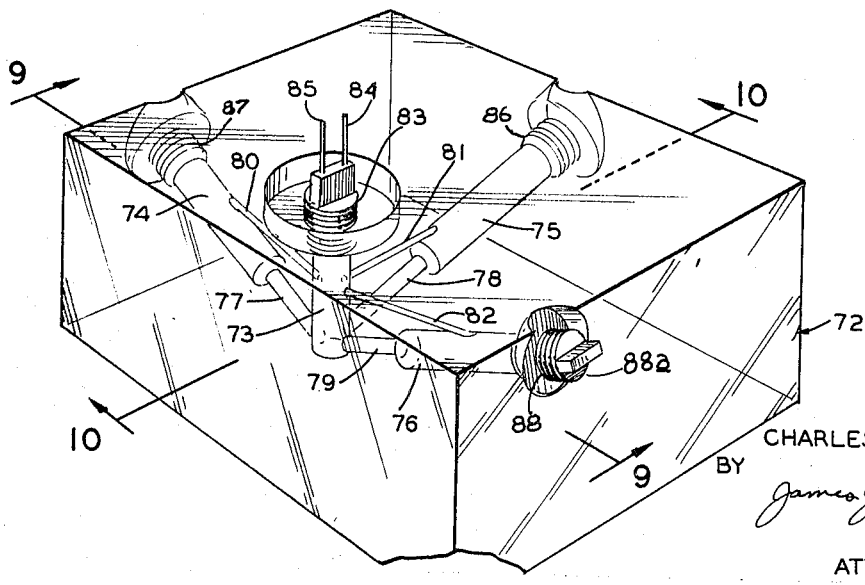
FIGURE 8 is a perspective view of another modification of the ignition cut-off assembly device set forth in FIGURE 1.
Figure 9:
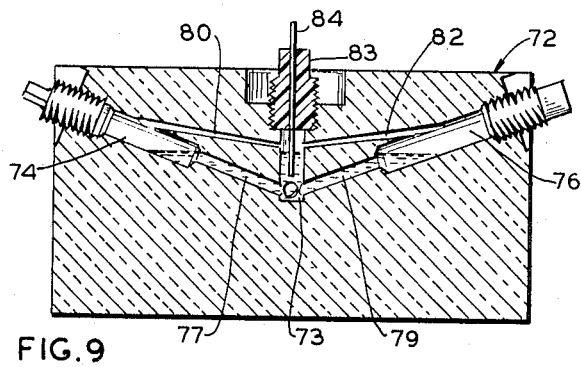
FIGURE 9 is a cross-sectional view of the ignition cut-off assembly device taken along line 9—9 of FIGURE 8.

FIGURE 8 shows a further modification of an ignition cut-off assembly device such as those shown in FIGURES 1 and 5. This device comprises a unitary ignition cut-off assembly device or tilt responsive switch 72 in the form of, for example, a substantially rectangular shaped block (similar to switch 43) of a high dielectric material such as molded polystyrene. Positioned within the interior area of assembly 72 is the sole, electric terminal-containing chamber 73 with reservoir chambers 74, 75 and 76 positioned at an angle, generally from about 5° to about 60° and preferably from about 20° to about 40°, with respect to a horizontal plane, thereto and surrounding said chamber 73. Chambers 74, 75 and 76 are generally spaced at 90° intervals one from the other such chamber; that is, chamber 74 is about 90° from chamber 75 which, in turn, is about 90° from chamber 76. Interconnections are made between all of these chambers by means of passageways or fluid ducts 77, 78, and 79 which all thus constitute (including chamber 73) a confined space for the free movement of liquid mercury therein. Air vents or ducts 80, 81, and 82 connect chambers 74, 75, and 76 with the upper portion of chamber 73. It will be noted that this ignition cut-off assembly device or switch 72 differs from the ignition cut-off device or switch shown in FIGURE 5 and also from the ignition cut-off device shown in FIGURE 1 in that switch 72 contains only one pair of spaced electrical terminals 84 and 85 partially contained within closure 83 and extending substantially into, for example, from about ¼ to about ⅞ of the length of chamber 73. Chambers 74, 75, and 76 are similar to chambers 47, 48 and 49 of FIGURE 5 and respectively contain similar threaded counterbores and closures (not numbered). FIGURE 9 is a cross-section of FIGURE 8 taken along line 9—9 and more clearly shows two separate and individual tilt responsive switches having a common electrode-containing chamber 73.

Figure 10:
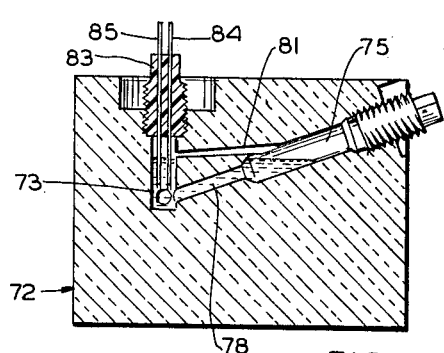
FIGURE 10 is a cross-sectional view of the ignition cut-off assembly device taken along line 10—10 of FIGURE 8.

FIGURE 10 is a cross-sectional view along line 10—10 of FIGURE 8 and also more clearly shows a separate tilt responsive switch of the ignition cut-off assembly device 72.

Chambers 73 through 76, fluid ducts 77–79 and gas ducts 80–82 are all substantially in the form of a longitudinally extending cylinder, preferably a right circular cylinder. The internal diameters of chambers 73–76 are all substantially the same. The internal diameters of the fluid ducts are also substantially the same but less than the internal diameter of any one of chambers 73–76. Likewise, the internal diameters of gas ducts 80–82 are all substantially the same but less than the internal diameter of any one of said fluid ducts.

The axis of fluid duct 77 is substantially perpendicular to the axis of fluid duct 78 which, in turn, is substantially perpendicular to the axis of fluid duct 79. These fluid ducts communicate with chamber 73 at the lower portion thereof and are inclined at an angle of from about 5° to about 60°, preferably from about 20° to about 40°, thereto with respect to a horizontal plane. It is to be noted that the respective axes of chambers 74–76 form a common straight line with the respective axes of fluid ducts 77–79; for example, the axes of fluid duct 77 and chamber 74, both taken together, form a common straight line. However, if one so desires, the respective fluid ducts may be so positioned whereby their respective axes are beneath the respective axes of the chambers, i.e., chambers 74–76.

With reference to FIGURES 8 through 10, gas ducts 80, 81, and 82 are positioned near the proximate ends, respectively, of chambers 74, 75, and 76. The axes of said ducts are non-parallel to the axes of either fluid ducts 77, 78, and 79 or chambers 74, 75, and 76. Gas ducts 80–82 communicate with chamber 73 at a point on the upper peripheral wall portion thereof. While not shown in FIGURES 8–10, the volume of mercury contained within the above-described confined space, that is, the volume of all the ducts and chambers, is equal to from about one time to about three times the volume of chamber 73.

Figure 11:
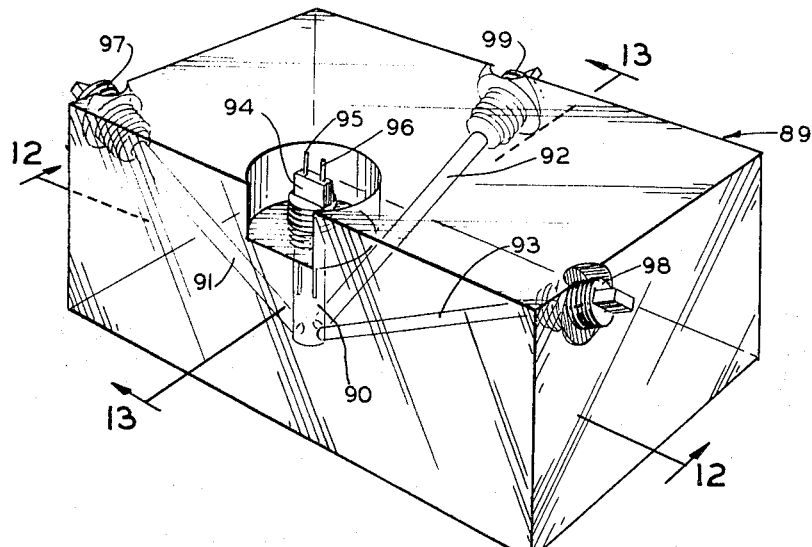
FIGURE 11 is a further modification of the ignition cut-off assembly device of FIGURE 1 and is shown in perspective form.

FIGURE 11 shows a modification of the unitary ignition cut-off assembly device of FIGURE 8 wherein the ignition cut-off assembly device or tilt responsive switch 89 has been vacuum sealed and thus the elimination of any passageways therein which would function as air vents. More specifically, FIGURE 11 shows an ignition cut-off assembly 89 of unitary construction of a dielectric material such as a molded polystyrene and including three inclined chambers, 91, 92, and 93, communicating with the bottom portion of a fourth chamber 90. Chamber 90 is likewise enclosed or sealed by closure 94 which, in turn, partially contains a pair of spaced electrical terminals 95 and 96 which extend substantially vertically through said closure 94 and protrude into the lower portion of chamber 90. Chambers 91, 92, and 93 are generally spaced at about 90° intervals from one other of such chambers. More specifically, chamber 91 is about 90° from chamber 92 which, in turn, is about 90° from chamber 93. The reason for such spacing is to cover the tilting of the moving vehicle as measured from three sides of said vehicle, for example, the right side, the left side and the front of said vehicle as viewed from a position of one who is operating such vehicle.

Figure 12:
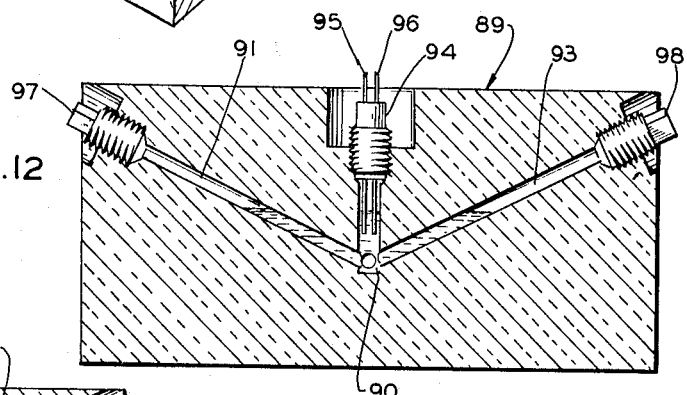
FIGURE 12 is a cross-sectional view of the ignition cut-off assembly device taken along line 12—12 of FIGURE 11.

FIGURE 12 is a cross-section of FIGURE 11 taken along line 12—12 and more clearly shows two individual tilt responsive switches which have a common electrode-containing chamber 90. Chambers 91 and 93 are respectively sealed (after vacuum has been applied thereto) by means of closures 98 and 97 which may be threaded to fit the threaded counterbores (not numbered) in housing 89. Thereafter, a coating of wax may be applied, for example, to provide an air tight seal therefor.

Figure 13:
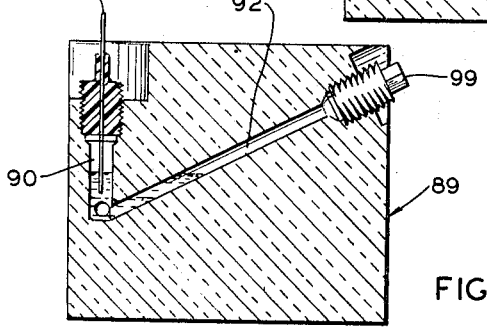
FIGURE 13 is a cross-sectional view of the ignition cut-off assembly device taken along line 13—13 of FIGURE 11.

FIGURE 13 is a cross-section of FIGURE 11 and taken along line 13—13 and shows a single tilt responsive switch comprising chambers 90 and 92. Chambers 92, respectively, is sealed by closure 99 in the same manner as chambers 91 and 93 were sealed, that is, by closures 97 and 98 after vacuum had been applied to such chambers. As previously mentioned, this ignition cut-off assembly device 89 has been vacuum sealed and thus there is eliminated the need for any air ducts contained therein. Furthermore, the internal diameters of chambers 91, 92 and 93 are usually smaller (as contrasted to the internal diameters of chambers 74, 75, and 76 shown in FIGURE 8) in order to substantially have the same internal diameter as the fluid ducts shown in FIGURE 8. Thus, the fluid ducts, as utilized in the other tilt responsive switches of, for example, FIGURE 8 have, in essence, become part of chambers 91, 92, and 93 as shown in FIGURES 11 through 13 since they are all the same internal diameter. Consequently, there are no separate fluid ducts per se but only the long, substantially longitudinally extending cylinders, that is, chambers 91–93.

Referring to FIGURES 11–13, chambers 91 through 93 are individually inclined with respect to chamber 90 and are at an angle of from about 5° to about 60°, preferably from about 20° to about 40°, with respect to a horizontal plane. Furthermore, the axis of chamber 91 is substantially perpendicular to the axis of chamber 92 which, in turn, is substantially perpendicular to chamber 93.

Figure 14:
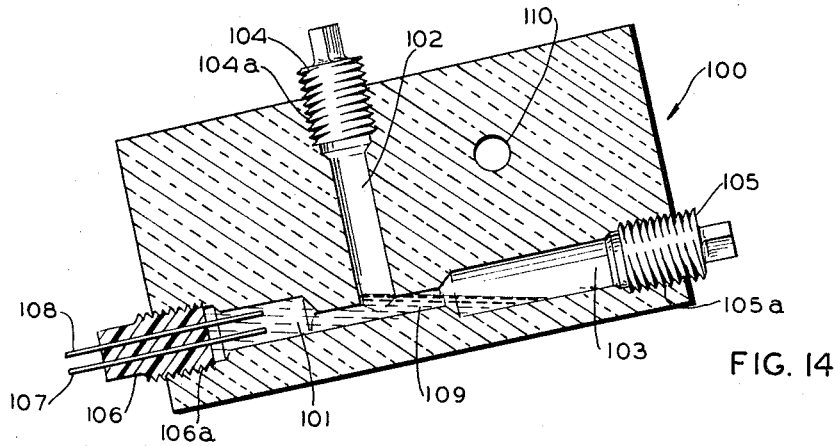
FIGURE 14 is a further modification of the tilt responsive switch of FIGURES 2 and 3 and is shown in cross-sectional view.

Referring now to FIGURE 14, there is disclosed a tilt responsive switch similar to the tilt responsive switches shown in FIGURES 1 through 4 but differentiating therefrom by not containing the air ducts as shown in FIGURES 1 through 4. Stated differently, FIGURE 14 discloses a tilt responsive switch 100 containing chambers 101, 102, and 103 with closures 104, 105, and 106 respectively positioned in counterbores 104a, 105a, and 106a. Closure 106 contains a pair of spaced electrical terminals 107 and 108 which extend longitudinally therethrough and protrude into chamber 101. Passageway or fluid duct 109 constitutes the sole interconnection between chambers 101, 102 and 103. Perforation or hole 110 constitutes a space within which a detachable fastener (not shown) may be inserted therethrough to connect switch 100 to a bracket or plate as shown in FIGURE 1. As previously mentioned, ignition cut-off assembly device 100 is vacuum sealed and, consequently, there is no need for air vents or passageways similar to those shown in FIGURES 1 through 4, for example, passageways 23 and 24 and 40 and 41 respectively shown in FIGURES 3 and 4.

FIGURE 15 is a diagrammatic view of an ignition system of an engine of a vehicle or airplane incorporating the tilt responsive switches, such as those shown in FIGURES 1 through 4, electrically within the system. More specifically, it will be noted in FIGURE 15 that the tilt responsive switches 111, 112 and 113 are in series and interconnected by means of wires 120 and 121. A pair of spaced electrical terminals 114 and 115 is shown embodied in tilt responsive switch 111. A second pair of spaced electrical terminals 116 and 117 is shown incorporated in tilt responsive switch 112. A third pair of spaced electrical terminals 118 and 119 is shown incorporated in tilt responsive switch 113. As previously mentioned, the tilt responsive switches are interconnected; for example, electrode 115 is connected to electrode 116 by a means of wire 120 and electrode 117 is connected to electrode 118 electrically by means of wire 121. By the same token, electrode 119 is electrically connected to battery 123 by means of wire 122, said battery 123 being grounded through wire 124 at ground 125. As an additional safety feature in the electrical diagrammatic view in FIGURE 15, there is incorporated a spring loaded switch 128 which is normally in the "off" position an which permits a vehicle operator to restart the engine after such vehicle is stalled by operation of the novel ignition cut-off device. Such switch comprises contact points 129 and 130 which complete a circuit between wires 126 and 127 by means of contact plate 131 which comes into contact with said contact points 129 and 130. As previously noted, this spring loaded switch 128 provides a means for restarting the ignition system when the vehicle, which incorporates said system, has been raised in an upward and backward manner or on either side and, thus, causing a circuit break by means of gravity actuation of any one of tilt responsive switches 111, 112, and 113. More specifically, and, for example, assuming that the vehicle is in an undesirable operating position, a circuit break will be caused by any one of said switches 111, 112, and 113. Thereafter, the spring loaded switch 128 is placed into operation by pushing plate 131 against contact points 129 and 130, and thus, there is completed an electrical circuit from battery 123 through lines 122, 126, 127, and 132 to ignition coil 133 which, in turn, is grounded at point 134 by means of wire 135. Ignition switch 136 is positioned between battery 123 and the intersection of wires 122 and 126 and provides a means to start the engine of the vehicle when said switch is in an "on" position.

Referring now more specifically to the operation of the novel tilt responsive assembly device, reference is called to FIGURES 1 and 15. The ignition cut-off assembly device 1 shown in FIGURE 1 is mounted in a substantially horizontal position on any type of movable vehicle such as, for example, a tractor. The assembly 1 is detachably mounted to said tractor whereby tilt responsive switch 5 is parallel to the length of said tractor. Tilt responsive switches 6 and 7 are on each side of switch 5 and, thus, act as side members to register the movements of the tractor when, for example, either the left or right wheels of the tractor raise up beyond a predetermined level and, consequently, cause the tilt responsive switches 6 and 7 to cause a circuit break as hereinafter described.

The specific operation of the novel ignition cut-off assembly is more clearly understood by reference to FIGURES 1, 2, and 15 of the enclosed drawings and operates in a manner hereinafter set forth. Referring specifically to FIGURES 1 and 2, the ignition cut-off assembly device 1 is substantially horizontally mounted on a tractor, for example, wherein plate 4 is in a forward position, that is, toward the front end of the tractor, and plate 2 is facing the right side of the tractor when viewing the tractor from a position immediately in front thereof. Referring now to FIGURE 15, the ignition system for a tractor is energized by means of the ignition switch 136 and the tractor is placed into operation thereby. The tilt responsive switches per se 111, 112, and 113 are mounted usually at an angle less than about 90° from the horizon and preferably at an angle from about 5 degrees to about 75 degrees and more preferably at an angle of from about 25 degrees to about 35 degrees. As the tractor carrying the ignition cut-off assembly device, as depicted in FIGURE 1, travels over rough terrain, the ignition cut-off assembly device is subjected to various shocks and vibrations. However, due to its unique configuration and design, specifically the various chambers with interconnecting passageways including air vents, such shocks, vibrations and mercury surgings have no effect on the mercury continuously contacting the terminals as depicted in FIGURE 2. However, upon the tractor proceeding up an inclination or rise, either with all the wheels going up or just one side going over an extremely sharp inclined area, a predetermined angle is passed which causes the mercury to move quickly away from at least one of the terminals and thereby break the electrical circuit. (This angle is taken into consideration when mounting said tilt responsive switches on the U-shaped member.) More specifically, the mercury encompassing the electrodes will, by gravity actuation, at least partially exit from, for example, chamber 11 as shown in FIGURE 2 through fluid duct 22, communicating with the bottom portion of chamber 11, into chamber 13. As the tractor continues to go up or over this particular inclination, a point is reached, which has been predetermined as completely hazardous and dangerous to the operator thereof, at which the mercury is out of contact with electrode 20 and thus breaks the electrical circuit of the overall ignition system and which consequently cuts off the tractor ignition system. Due to the particular configuration of the tilt responsive switches as depicted in FIGURES 1 through 4 and the other figures shown in the accompanying drawings, the mercury (after the predetermined angle is passed by the orientation of said switch) is instantaneously drawn away from one of the electrical terminals thereby breaking the electrical current between the terminals and instantly stopping the engine.

In conjunction with the subject matter set forth immediately above, it can readily be seen that the instantaneous removal of the mercury from chamber 11, for example, as depicted in FIGURE 2, quickly stops the engine and thus the unique and novel feature of the present invention provides a switch which acts immediately to cut off the ignition. In the event that any gas vapors escape from an inverted carburetor or broken gas line or tank, it must be remembered that it takes less than a thousandth part of a second to cause a fire or explosion. Therefore, there must be no time delay in the free flow of the mercury. The novel tilt responsive switch of the present invention has substantially overcome such time delays and yet, at the same time, the switch gives such performance that excessive vibrations do not cause the circuit to be interrupted to cut off the ignition. If, for example, the circuit should be interrupted for a very brief interval resulting from vibration, there is apt to be serious damage resulting from the danger of explosion of unburnt gases in the exhaust manifold pipe even to the extent of blowing off the muffler. If unburnt gas is pumped into the exhaust manifold and the exhaust pipe and then with the restoration of ignition, these unburnt gases immediately explode and serious damage will inherently result. By the same token, the unique design of the present invention permits a maximum amount of liquid (mercury) surgings, shocks or vibrations. However, such design does not cause the cutoff of the ignition which would thus require an operator who is operating his tractor over hilly terrain to continuously start his tractor due to these cut-offs which have been the inherent disadvantage of the prior art apparatuses or devices heretofore set forth.

Although the invention has been described in its preferred form with a certain degree of particularity, it is understood that the present disclosure of the preferred form has been made only by way of example and that numerous changes in the details of construction, materials of construction and the combination and arrangement of parts may be resorted to without departing from the spirit and the scope of the invention as hereinafter claimed. It is to be understood that the matter contained in each of the following claims is to be read as part of the general description of the present invention.

What is claimed is:

1. A tilt responsive switch for sensing orientation of an element and terminating a continuous signal when the orientation has exceeded a predetermined limit; said switch comprising a housing adapted for rigid mounting on said element and being movable therewith, said housing having a first, second and third chamber, a fluid duct connecting said chambers, a pair of spaced, adjacent electric terminals extending into said housing, an electrically conductive fluid in said housing and being freely movable between said chambers; said terminals being located in said first chamber so that both of said terminals contact said fluid when said housing is orientated in a first position thus providing a continuous signal caused by the electrical connection between said terminals, and at least one of said terminals remains out of contact with said fluid when said housing is orientated to a second position so that said signal is terminated when said terminals are electrically disconnected from each other by the removal of said fluid from contact with both of said terminals when said element is orientated to a position which exceeds said predetermined limit, said fluid duct providing restrictive means to maintain the electrically conductive fluid in contact with the pair of electrical terminals during abrupt movements of said element.

2. The tilt responsive switch as set forth in claim 1 and including (a) a first gas duct extending between said third chamber and said first chamber; and (b) a second gas duct extending between said third chamber and said second chamber, said first and second gas ducts permitting the transfer of gas in said housing responsive to the orientations of said switch.

3. The tilt responsive switch as set forth in claim 2 wherein said gas ducts are located near the respective proximate ends of said first and said second chambers with respect to said third chamber.

4. The tilt responsive switch as set forth in claim 2 wherein one of the gas ducts is located near the distal end of said second chamber and the other gas duct is located near the proximate end of the first chamber with respect to said third chamber.

5. A tilt responsive switch for sensing orientation of a movable element and terminating a continuous signal when the orientation has exceeded a predetermined limit; said switch comprising a housing adapted for rigid mounting on said element and being movable therewith, said housing having a first and second chamber, a fluid duct connecting said first and said second chambers, a third chamber formed in said housing and communicating with said fluid duct, said first, second and third chambers having substantially the same internal diameter and each of said chambers being substantially in the form of a longitudinally extending cylinder; the axes of said first chamber and said second chamber being substantially parallel to each other, the axis of said second chamber being beneath the axis of said first chamber, the axis of said third chamber being substantially perpendicular to said axes of said first and second chambers; a volume of electrically conductive fluid in said housing and being freely movable between each of said chambers responsive to the reorientation of said housing; a pair of electric terminals extending into said housing and terminating in said first chamber, said terminals being so positioned in said first chamber so that both of said terminals contact said fluid when said housing is orientated in a first position thus providing a continuous signal caused by the electrical connection between said terminals, and at least one of said terminals remains out of contact with said fluid when said housing is orientated to a second position so that said signal is terminated when said terminals are electrically disconnected from each other by the removal of said fluid from contact with both of said terminals when said element is orientated to a position which exceeds said predetermined limit; a first gas duct extending between said third chamber and said first chamber, a second gas duct extending between said third chamber and said second chamber, said gas ducts so adapted as to permit the transfer of gas in said housing responsive to the orientations of said switch, and each of said gas ducts being substantially in the form of a longitudinally extending cylinder and having an internal diameter less than the internal diameter of said first, second and third chambers.

6. The tilt responsive switch as set forth in claim 1 and including fourth, fifth and sixth chambers; a second and third pair of electric terminals extending into said housing, all of said pairs of electric terminals being responsive to the orientations of said housing so that a continuous signal is provided when said electrically conductive fluid is in contact with both terminals of all of said pairs of electric terminals, said signal being terminated when at least one terminal of at least one pair of terminals remains out of contact with said fluid when said element exceeds a predetermined limit.

7. The tilt responsive switch as set forth in claim 6 wherein a first gas duct connects said third chamber with said fourth chamber, a second gas duct connects said first chamber with said second, third and fifth chambers, a third gas duct connects said fifth chamber with said sixth chamber; a second fluid duct connects said fourth chamber with said sixth chamber and a third fluid duct connects said third chamber with said fifth chamber.

8. The tilt responsive switch as set forth in claim 7 wherein each of the aforementioned chambers have substantially the same internal diameter and each is substantially in the form of a longitudinally extending cylinder; said gas ducts have substantially the same internal diameter, but less than the internal diameter of said fluid ducts, and each being substantially in the form of a longitudinally extending cylinder; said fluid duct have substantially the same internal diameter, but less than the internal diameter of said chambers, and each being substantially in the form of a longitudinally extending cylinder; and the respective axes of the first, fourth and fifth chambers being substantially parallel to the respective axes of the second, sixth and third chambers, said respective axes of the second, sixth and third chambers being respectively beneath the axes of the first, fourth and fifth chambers.

9. A tilt responsive switch for sensing orientation of a movable element and terminating a continuous signal when the orientation has exceeded a predetermined limit; said switch comprising a dielectric housing adapted for rigid mounting on said element and being movable therewith, said housing having first, second, third, fourth, fifth, and sixth chambers, each of said chambers having substantially the same internal diameter and each of said chambers being substantially in the form of a longitudinally extending cylinder, the respective axes of said first and second chambers, third and fifth chambers, and fourth and sixth chambers constitute parallel lines, the respective axes of said second, sixth and third chambers being beneath the axes of said first, fourth and fifth chambers, and said second, fourth and sixth chambers communicating with each other at a common point; individual access means provided for said housing and separately communicating with each of said chambers; separate closure means provided for each access means so that upon the removal of said closure means said chambers communicate through said access means to outside of said housing; a first fluid duct connecting said first chamber with said second chamber, a second fluid duct connecting said fourth chamber with said sixth chamber, a third fluid duct connecting said fifth chamber with said third chamber, each of said fluid ducts having substantially the same internal diameter which is less than the internal diameter of said chambers, each of said fluid ducts being substantially in the form of a longitudinally extending cylinder; a volume of electrically conductive fluid within said housing and being freely movable between said chambers responsive to the orientation of said housing, the volume of said fluid being equal to from about two times to about four times the volume of any one of said first, fourth, and fifth chambers; a first, second, and third pair of electric terminals extending into said housing and respectively terminating in said first, fourth, and fifth chambers, said pair of terminals being positioned in their respective chambers so that both of said terminals of all of said pairs contact said fluid when said housing is orientated in a first position thus providing a continuous signal caused by the electrical connection between said terminals, and at least one of said terminals of at least one of said pairs remains out of contact with said fluid when said housing is orientated to a second position so that said signal is terminated when said terminals of at least one of said pairs of terminals are electrically disconnected from each other by the removal of said fluid from contact with both of said terminals when said element is orientated to a position which exceeds said predetermined limit; a first gas duct connecting said third chamber with said fourth chamber, a second gas duct connecting said first chamber with said second, third, and fifth chambers, and a third gas duct connecting said fifth chamber with said sixth chamber, said gas ducts each having substantially the same internal diameter, but less than the internal diameter of said fluid ducts, each gas duct being substantially in the form of a longitudinally extending cylinder.

10. The tilt responsive switch as set forth in claim 1 including a fourth chamber, a second fluid duct connecting said second chamber with said third chamber, a third fluid duct connecting said second chamber with said fourth chamber, a first gas duct connecting said first chamber with said second chamber, a second gas duct connecting said third chamber with said second chamber, and a third gas duct connecting said fourth chamber with said second chamber.

11. The tilt responsive switch as set forth in claim 10 wherein each of said chambers have substantially the same internal diameter and each chamber is substantially in the form of a longitudinally extending cylinder; said first, second and third fluid ducts have substantially the same internal diameter but less than the internal diameter of said chambers and each being substantially in the form of a longitudinally extending cylinder; said first, second and third gas ducts having substantially the same internal diameter, but less than the internal diameter of said fluid ducts, and each being substantially in the form of a longitudinally extending cylinder.

12. The tilt responsive switch as set forth in claim 11 wherein said fluid ducts communicate with the lower portion of the second chamber and are inclined thereto at an angle of from about 5° to about 60° with respect to a horizontal plane; the axis of the first fluid duct being substantially perpendicular to the axis of said second fluid duct and the axis of said second fluid duct being substantially perpendicular to the axis of said third fluid duct.

13. The tilt responsive switch as set forth in claim 12 wherein said gas ducts are positioned near the proximate end of their respective chambers with respect to said second chamber and communicate with said second chamber at a point on the upper portion thereof.

14. A tilt responsive switch for sensing orientation of an element and terminating a continuous signal when the orientation has exceeded a predetermined limit, and switch comprising a dielectric housing adapted for rigid mounting on said element and being movable therewith, said housing having first, second, third, and fourth chambers, each of said chambers having substantially the same internal diameter and each of said chambers being substantially in the form of a longitudinally extending cylinder; individual access means provided for said housing and separately communicating with each of said chambers, separate closure means provided for each access means so that upon the removal of said closure means said chambers communicate through said access means to the outside of said housing; a first fluid duct connecting said first chamber with said second chamber, a second fluid duct connecting said third chamber with said second chamber, a third fluid duct connecting said fourth chamber with said second chamber, each of said fluid ducts having substantially the same internal diameter which is less than the internal diameter of said chambers, and each of said fluid ducts being substantially in the form of a longitudinally extending cylinder, said fluid ducts being in communication with the lower portion of the second chamber and are inclined thereto at an angle of from about 20° to about 40° with respect to a horizontal plane, the axis of said first fluid duct being substantially perpendicular to the axis of said second fluid duct and the axis of said second fluid duct being substantially perpendicular to the axis of said third fluid duct; a volume of electrically conductive fluid within said housing and being freely movable between said chambers responsive to the orientation of said housing, the volume of said fluid being equal to from about one times to about three times the volume of said second chamber; a pair of electric terminals extending into said housing and terminating in said second chamber at a point in the lower portion thereof, said terminals being positioned in said second chamber so that both of said terminals contact said fluid when said housing is orientated in a first position thus providing a continuous signal caused by the electrical connection between said terminals, and at least one of said terminals remains out of contact with said fluid when said housing is orientated to a second position so that said signal is terminated when said terminals are electrically disconnected from each other by the removal of said fluid from contact with both of said terminals when said element is orientated to a position which exceeds said predetermined limit; a first gas duct connecting said first chamber with said second chamber, a second gas duct connecting said third chamber with said second chamber and a third gas duct connecting said fourth chamber with said second chamber, each of said gas ducts having substantially the same internal diameter, but less than the internal diameter of said fluid ducts, each of said gas ducts being substantially in the form of a longitudinally extending cylinder, said gas ducts being positioned near the proximate end of their respective chambers with respect to the second chamber and communicating with said second chamber at a point on the upper portion thereof.

15. A tilt responsive switch for sensing orientation of a movable element and terminating a continuous signal when the orientation has exceeded a predetermined limit; said switch comprising a housing having first, second, third and fourth chambers, said second, third and fourth chambers each individually and separately communicating with said first chamber; an electrically conductive fluid in said housing and being freely movable between each of said chambers responsive to the orientation of said housing; a pair of spaced, adjacent electrical terminals extending into said housing, said terminals being positioned in said first chamber so that both of said terminals contact said fluid when said housing is orientated in one position, thus providing a continuous signal caused by the electrical connection between said terminals, and at least one of said terminals remains out of contact with said fluid when the housing is orientated to a second position so that said signal is terminated when said terminals are electrically disconnected from each other by the removal of said fluid from contact with both of said terminals when said element is orientated to a position which exceeds said predetermined limit, each of said chambers is substantially in the form of a longitudinally extending cylinder; the axis of the second chamber is substantially perpendicular to the axis of the third chamber and the axis of said third chamber is substantially perpendicular to the axis of said fourth chamber; said second, third, and fourth chambers individually communicating with first chamber at the lower portion thereof and being inclined thereto at an angle of from about 5° to about 60° with respect to a horizontal plane.

16. The tilt responsive switch as set forth in claim 15 wherein each of said chambers has substantially the same internal diameter.

17. The tilt responsive switch as set forth in claim 16 wherein the said electrical terminals extend into said first chamber and terminate therein at a position in the lower portion thereof; said electrically conductive fluid is mercury; individual access means provided for said housing and separately communicating with each of said chambers; separate closure means for each of said access means so that upon removal of said closure means said chambers communicate through such access means to the outside of said housing; and said housing is constructed of a dielectric material.

References Cited
UNITED STATES PATENTS

| | | | |
|---|---|---|---|
| 1,861,800 | 6/1932 | Janisch | 200—61.47 |
| 2,535,207 | 12/1950 | Hook et al. | 200—61.47 |
| 3,030,477 | 4/1962 | Hensley | 200—152 |

BERNARD A. GILHEANY, *Primary Examiner.*

H. B. GILSON, *Assistant Examiner.*